US011880266B2

United States Patent
Senn et al.

(10) Patent No.: US 11,880,266 B2
(45) Date of Patent: Jan. 23, 2024

(54) MALFUNCTION MONITOR FOR COMPUTING DEVICES

(71) Applicant: Target Brands, Inc., Minneapolis, MN (US)

(72) Inventors: Jacob L. Senn, Sartell, MN (US); Jena L. Boerum, Maple Grove, MN (US); Thomas J. Kimlinger, Fridley, MN (US); Anthony L Fillmore, Cedar, MN (US); Ankit Singh, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/736,543

(22) Filed: May 4, 2022

(65) Prior Publication Data
US 2023/0359517 A1 Nov. 9, 2023

(51) Int. Cl.
*G06F 11/00* (2006.01)
*G06F 11/07* (2006.01)

(52) U.S. Cl.
CPC ........ *G06F 11/076* (2013.01); *G06F 11/0709* (2013.01)

(58) Field of Classification Search
CPC .............. G06F 11/327; G06F 11/3409; G06F 11/3089; G06F 11/3006; G06F 11/0751; G06F 11/0709; G06F 11/3476
See application file for complete search history.

(56) References Cited

U.S. PATENT DOCUMENTS

| | | | |
|---|---|---|---|
| 7,246,156 B2 | 7/2007 | Ginter et al. | |
| 7,603,458 B1 | 10/2009 | Sexton et al. | |
| 9,384,112 B2 | 7/2016 | Petersen et al. | |
| 10,257,268 B2 | 4/2019 | Cencini et al. | |
| 10,521,324 B2 | 12/2019 | Whitner et al. | |
| 10,924,350 B1* | 2/2021 | Kaminski | H04L 41/0896 |
| 11,070,452 B1 | 7/2021 | Roy et al. | |
| 2006/0230309 A1 | 10/2006 | Kromer et al. | |
| 2018/0157525 A1* | 6/2018 | Song | G06F 13/24 |
| 2022/0342740 A1* | 10/2022 | Luo | G06F 11/079 |

OTHER PUBLICATIONS

Sirvio, Monitoring of a Cloud-Based IT Infrastructure, Master of Science in Technology Thesis, https://www.utupub.fi/bitstream/handle/10024/151812/Sirvio_Janne_opinnayte.pdf?sequence=1, 100 pages, 2021.

* cited by examiner

*Primary Examiner* — Charles Ehne
(74) *Attorney, Agent, or Firm* — Theodore M. Magee; Westman, Champlin & Koehler, P.A.

(57) ABSTRACT

A processor on a computing device executes a monitoring module to perform steps that include sending a request to a baseboard management controller in the computing device to search for an event in an event log maintained by the baseboard management controller. A response is received from the baseboard management controller in response to the request and is used with a current state of the monitoring module to determine whether to send an event message to a central controller located on a network to indicate that the computing device is malfunctioning.

16 Claims, 5 Drawing Sheets

MALFUNCTION MONITOR FOR COMPUTING DEVICES

BACKGROUND

In most computing devices, a motherboard within the computing devices contains a central processing unit that executes an operating system. The operating system includes an event logging system that logs important software and hardware events such as low-memory conditions or disc read/write failures. Some computing devices also include a baseboard management controller on the motherboard that is independent of the central processing unit and the operating system. The baseboard management controller receives sensor values from one or more sensors located in the computing device such as voltage sensors, fan speed sensors, and temperature sensors. The baseboard management controller also maintains its own system event log that contains events when a respective sensor's value exceeded a threshold value. The events maintained in the baseboard management controller's event log can be accessed by an application running in the operating system's environment by making requests to the baseboard management controller. Events in the baseboard management controller's event log can also be accessed externally by making requests to the baseboard management controller through a network interface controller.

The discussion above is merely provided for general background information and is not intended to be used as an aid in determining the scope of the claimed subject matter. The claimed subject matter is not limited to implementations that solve any or all disadvantages noted in the background.

SUMMARY

A processor on a computing device executes a monitoring module to perform steps that include sending a request to a baseboard management controller in the computing device to search for an event in an event log maintained by the baseboard management controller. A response is received from the baseboard management controller in response to the request and is used with a current state of the monitoring module to determine whether to send an event message to a central controller located on a network to indicate that the computing device is malfunctioning.

In a further embodiment, a system includes a plurality of computing devices and a server. Each of the plurality of computing devices have a processor executing an agent that obtains information from a baseboard management controller in the computing device and that uses the information to determine whether to transmit an event message so as to avoid transmitting false event messages. The server executes a central event message handler configured to receive event messages from the plurality of computing devices and to determine an action to take in response to each event message.

In a still further embodiment. a computing device includes a baseboard management controller and a processor. The processor executes an agent that obtains information from the baseboard management controller and uses the information to determine whether to transmit an event message across a network so as to avoid transmitting false event messages across the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In large-scale computing systems, administrators must monitor thousands of computing devices for malfunctions. Interrogating this large number of computing devices remotely to determine if some aspect of one of the computing devices is malfunctioning is inefficient because it requires a large amount of network traffic to be sent across the network. Specifically, for each possible malfunction, a request for events related to that malfunction must be sent to each computing device several times per minute. This network traffic negatively impacts the performance of the enterprise's network.

Embodiments described below reduce the amount of network traffic associated with remotely monitoring large numbers of computing devices for malfunctions by utilizing monitoring agents that execute on the computing devices. These agents are responsible for requesting events from the baseboard management controller and the operating system using calls that do not require data to flow through a network. In addition, the agents verify whether an event received from the baseboard management controller or operating system is indicative of an actual malfunction of the device before sending an event message to a remote central controller. By verifying that there is an actual malfunction before sending an event message to the remote central controller, the embodiments keep event messages related to transient events from being placed on the network. This helps to improve the performance of the network.

Figure 1:
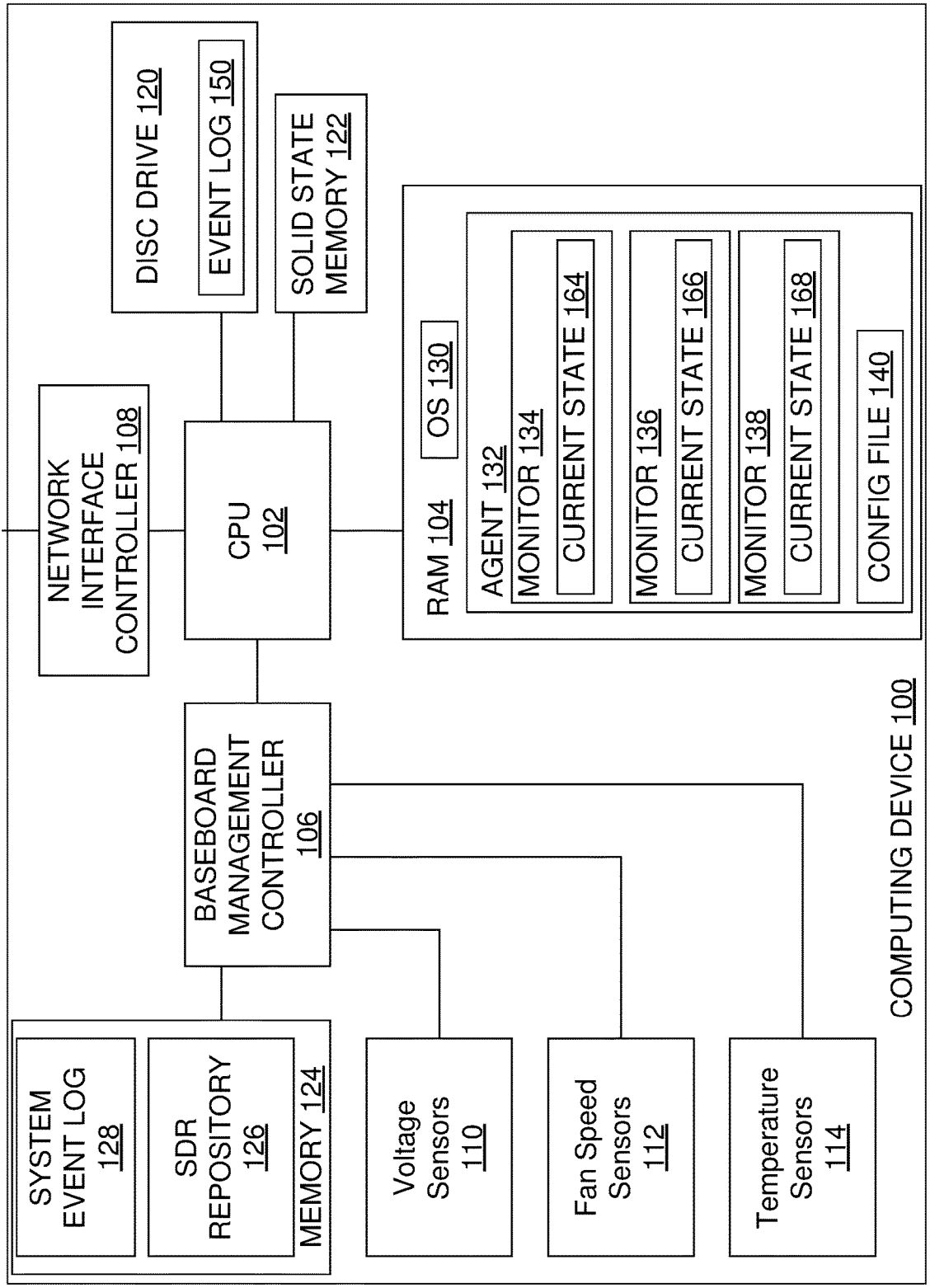
FIG. 1 is a block diagram of a computing device in accordance with one embodiment.

FIG. 1 provides a block diagram of a computing device 100 in accordance with one embodiment. Computing device 100 includes a central processing unit 102 that is connected to a random access memory 104, a baseboard management controller 106 and a network interface controller 108. Central processing unit 102 is also connected to a disc drive 120 and/or a solid state memory 122.

Baseboard management controller 106 is further connected to a plurality of sensors that sense the state of various hardware components in computing device 100. For example, these sensors include one or more voltage sensors 110 that sense the voltage on various power supply lines in computing device 100; one or more fan speed sensors 112 that sense the speed of cooling fans in the computing device; and one or more temperature sensors 114 that sense the temperature of different areas or components in computing device 100. The sensors connected to baseboard management controller 106 are not limited to sensors 110, 112 and 114 and additional sensor types may be used. Baseboard management controller 106 is also connected to a non-volatile memory 124 that contains a Sensor Data Record (SDR) repository 126 and a system event log 128.

Random access memory 104 contains an operating system 130 and an agent 132 consisting of a plurality of monitor modules such as monitors 134, 136 and 138 and a configuration file 140. Operating system 130 is a collection of computer instructions executed by central processing unit 102 to provide support and services to applications executed by central processing unit 102 and to manage hardware and software resources on computing device 100. Operating system 130 includes instructions for receiving and storing error events reported by hardware and software. In accordance with one embodiment, the error events are stored in an event log 150 located on either disc drive 120 or solid state memory 122.

Agent 132 is a local event analyzer. Each of monitors 134, 136 and 138 within agent 132 are responsible for monitoring and verifying a different respective event type logged by either baseboard management controller 106 or operating system 130. For example, in one embodiment, monitor 134 is responsible for analyzing and verifying voltage events on a main power supply bus while monitor 136 is responsible for analyzing and verifying fan speed events for a chassis fan. The monitors are executed in parallel such that different event types can be verified in parallel.

Operating system 130 and the monitors of agent 132 are executed by central processing unit 102. To obtain information about events, monitors 134, 136 and 138 make requests to operating system 130 and/or baseboard management controller 106 for any events related to a particular sensor, hardware device or software application associated with the respective monitor. Using a method described below, each monitor verifies events based on the information it receives and once a monitor has verified a malfunction of the computing device based on the event information, the monitor sends an event message to a central event message handler through network interface controller 108.

Figure 2:
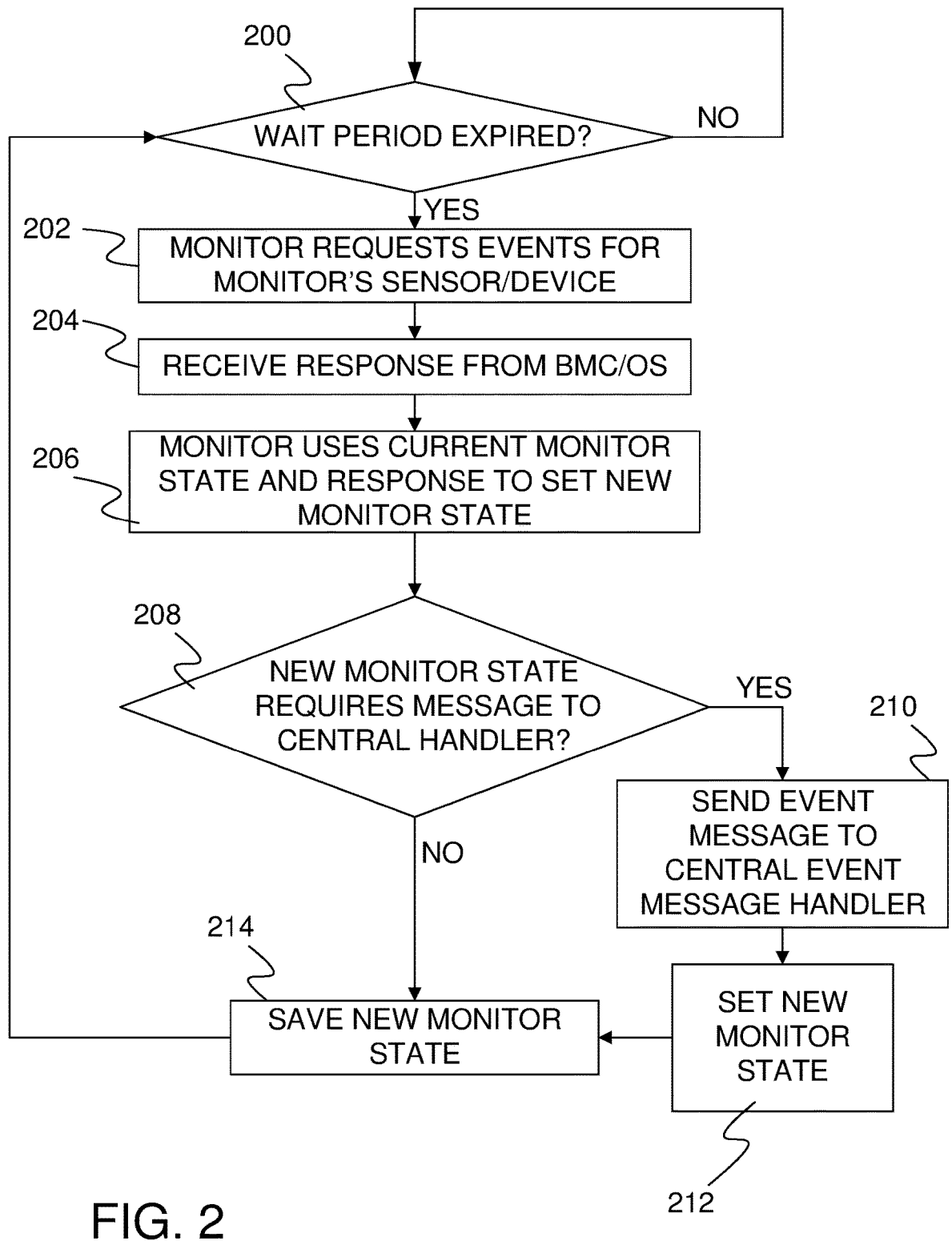
FIG. 2 is a flow diagram of a method performed by a monitor in an agent.

FIG. 2 provides a flow diagram of the method performed by monitors 134, 136 and 138 to monitor event information to verify that computing device 100 is malfunctioning before sending an event message to the central event message handler. In step 200, the monitor determines if a wait period for requesting event information has expired. In accordance with one embodiment, when a monitor is first started by agent 132, the wait period is set to a time period designated in configuration file 140 for the monitor.

When the wait period has expired, the monitor requests events for the monitor's sensor/device from operating system 130 and/or baseboard management controller 106 at step 202. In accordance with one embodiment, such a request to operating system 130 is a request for all events stored in event log 150 that relate to the monitor's sensor or device. For example, the request to operating system 130 is a request for all low-memory events stored in event log 150 since the last request for such events was made. In another example, the request to baseboard management controller 106 is a request for all low-voltage events on the system power bus that were stored in system event log 128 since the last request for such events was made.

At step 204, the monitor receives a response from baseboard management controller 106/operating system 130. This response can be information related to one or more events stored in system event log 128 or event log 150 for a particular sensor/device or can be an indication that no events were found for the sensor/device.

As shown in FIG. 1, each monitor has a current state, such as current states 164, 166, and 168 of monitors 134, 136 and 138, respectively. The current state of the monitor includes a collection of information that is indicative of previous steps that have been taken by the monitor to verify a malfunction of computing device 100 as well as information that is used to determine the next step that the monitor should take to verify the malfunction. Examples of the current state include the number of times that events indicating a malfunction have been received, the number of times over a period of time that events indicating a malfunction have been received, the time at which a first indication of the malfunction was received, and a time at which a last indication of the malfunction was received, for example.

In step 206, the monitor uses the current state of the monitor and the response received from baseboard management controller 106/operating system 130 to set a new state for the monitor.

One example of setting a new state involves using a number of times an indication of a malfunction has been received from baseboard management controller 106/operating system 130. In such an embodiment, when the latest response received from baseboard management controller 106/operating system 130 provides information about a malfunction of the device, setting the new state for the monitor involves increasing the count of the number of times in a row that an indication of a malfunction has been received to form a new count and comparing this new count to an alert threshold. If the new count does not exceed the alert threshold, the new monitor state is set to wait for additional event information from baseboard controller 106/operating system 130 and the new count is included in the new monitor state. If the new count exceeds the alert threshold, the new monitor state is set to require that an alert message be sent to the central event message handler.

In another embodiment, setting a new state involves using a number of times an indication of a malfunction has been received from baseboard management controller 106/operating system 130 in a time period. In such an embodiment, when the latest response received from baseboard management controller 106/operating system 130 provides information about a malfunction of the device, setting the new state for the monitor involves using a time at which the latest response was received and the time period to determine how many indications of the malfunction have been received within the time period. This count/time period is then compared to a threshold count/time period. If the count/time period does not exceed the alert threshold, the new monitor state is set to wait for additional event information from baseboard controller 106/operating system 130. If the count/time period exceeds the alert threshold, the new monitor state is set to require that an alert message be sent to the central event message handler.

In another embodiment, when the latest response received from baseboard management controller 106/operating system 130 provides information about a malfunction of the device, setting the new state for the monitor involves determining the time span between the current time and the time at which the first indication of the malfunction was received. This measured time span is then compared to a threshold time span and if the measured time span does not exceed the threshold time span, the monitor state is set to wait for further information from baseboard management controller 106/operating system 130. When the measured time span exceeds the threshold time span, the new monitor state is set to require than an alert message be sent to the central event message handler.

In another embodiment, when the latest response received from baseboard management controller 106/operating system 130 provides information about a malfunction of the device, setting the new state for the monitor involves determining the time span between the current time and the time at which the preceding indication of the malfunction was received. This measured time span is then compared to a threshold time span and if the measured time span is greater than the threshold time span, the monitor state is set to wait for further information from baseboard management controller 106/operating system 130. In addition, the time when the latest indication of the malfunction was received is changed to the time of the latest response received from baseboard management controller 106/operating system 130. When the measured time span is less than the threshold time span, the new monitor state is set to require than an alert message be sent to the central event message handler.

At step 208, the monitor determines if the new state for the monitor requires that an alert message be sent to the central event message handler. When the new state requires that an event message be sent, the monitor constructs the event massage and sends the event message to the central event message handler at step 210. The event message indicates that the computing device is malfunctioning. After the event message is sent, the state for the monitor is again changed to reflect that an event message has been sent at step 212.

This new state can include the time at which the event message was sent and an update to a total number of event messages that have been sent for a malfunction. This information can be used in later iterations of step 206 to determine if a new event message should be sent to the central event message handler. In some embodiments, if an event message has already been sent for a malfunction, the monitor will not send further event messages even though later responses from baseboard management controller 106/operating system 130 indicate that the malfunction continues to exist in computing device 100. Such embodiments minimize the amount of network traffic that is sent to the central event message handler for a malfunction of the computing device. In other embodiments, the time at which the last event message was sent is used in step 206 to determine if enough time has passed that an additional event message should be sent to the central event message handler for the malfunction. Such embodiments, provide more information to the central event message handler allowing more functionality at the central event message handler. For example, the central event message handler can be designed to wait for a certain number of event messages for a malfunction before taking action or can increase the severity of a repair request based on the number of event messages that have been received for a malfunction.

After step 212 or if the new monitor state does not require that an event message be sent to the central event message handler at step 208, the process of FIG. 2 continues at step 214 where the new state for the monitor is saved as the current state. The monitor then returns to step 200 to wait for a period of time set in configuration file 140.

Figure 3:
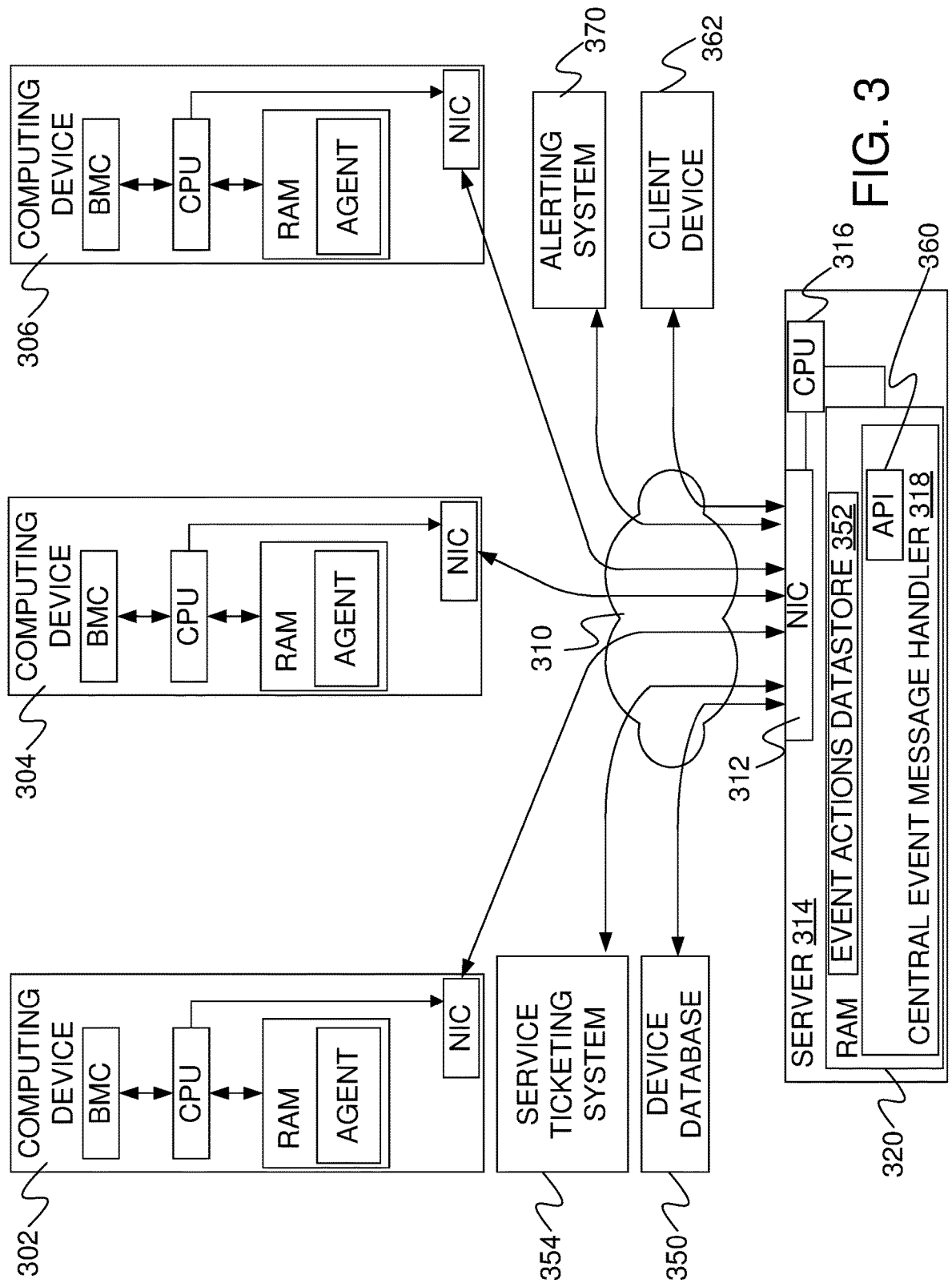
FIG. 3 is a block diagram of a system in accordance with one embodiment.

FIG. 3 provides a block diagram of a system 300 that includes a large number of computing devices, such as computing devices 302, 304 and 306, that have the same components and operate in the same way as computing device 100 of FIG. 1. For simplicity, the depictions of computing devices 302, 304 and 306 is limited to showing the baseboard management controller (BMC), the central processing unit (CPU), the random-access memory containing the agent, and the network interface controller (NIC). However, it should be recognized that all of the components depicted in FIG. 1 are present in computing devices 302, 304 and 306.

When a monitor sends an event message through its respective network interface controller, it passes through a network 310 to a network interface controller 312 of a server 314. Network interface controller 312 provides the message to a central processing unit 316 that is executing a central event message handler 318 stored in a random-access memory 320. In stored as part of the new monitor state.

Network interface controller 312 and central event message handler 318 have a limited bandwidth and as such have a maximum number of event messages that they can handle during a period of time. Without agents 132, central event message handler 318 would have to request information from the baseboard management controller and operating system on each computing device for each possible malfunction of the computer and process each response to determine which computers are actually malfunctioning. This would easily exceed the bandwidth of network interface controller 312 and central event message handler 318.

In addition, without the agents of the present embodiments, central event message handler 318 would be responsible for determining whether a response from the baseboard management controller/operating system represented a false event message or an actual malfunction of the computing device. The baseboard management controller and the operating system often report transient events, such as a temporary low-memory status or a temporary flux in voltage, that are not associated with an actual malfunction of the computing device. Because event messages for transient events do not represent actual malfunctions, they are considered false event messages. Without the agents, central event message handler 318 would have to take additional steps to discern whether information in the responses from the baseboard management controller/operating system represented an actual malfunction or a false event. This would often involve the central event message handler making repeated requests to the baseboard management controller/operating system for a single transient error. Such repeated requests further increases the traffic handled by network interface controller 312 and central event message handler 318.

By providing agents 132, the present embodiments are able to reduce the level of data sent to network interface controller 312 and central event message handler 318. In particular, the agents eliminate all data traffic that would otherwise be present if central event message handler 318 had to request and receive event information from the baseboard management controller/operating system on each of the computing devices. In particular, the agents remove false event messages from the network. The agents also eliminate the data traffic that would otherwise be present if the central event message handler had to make further requests for information to verify whether a malfunction is actually present in the computing device.

Figure 4:
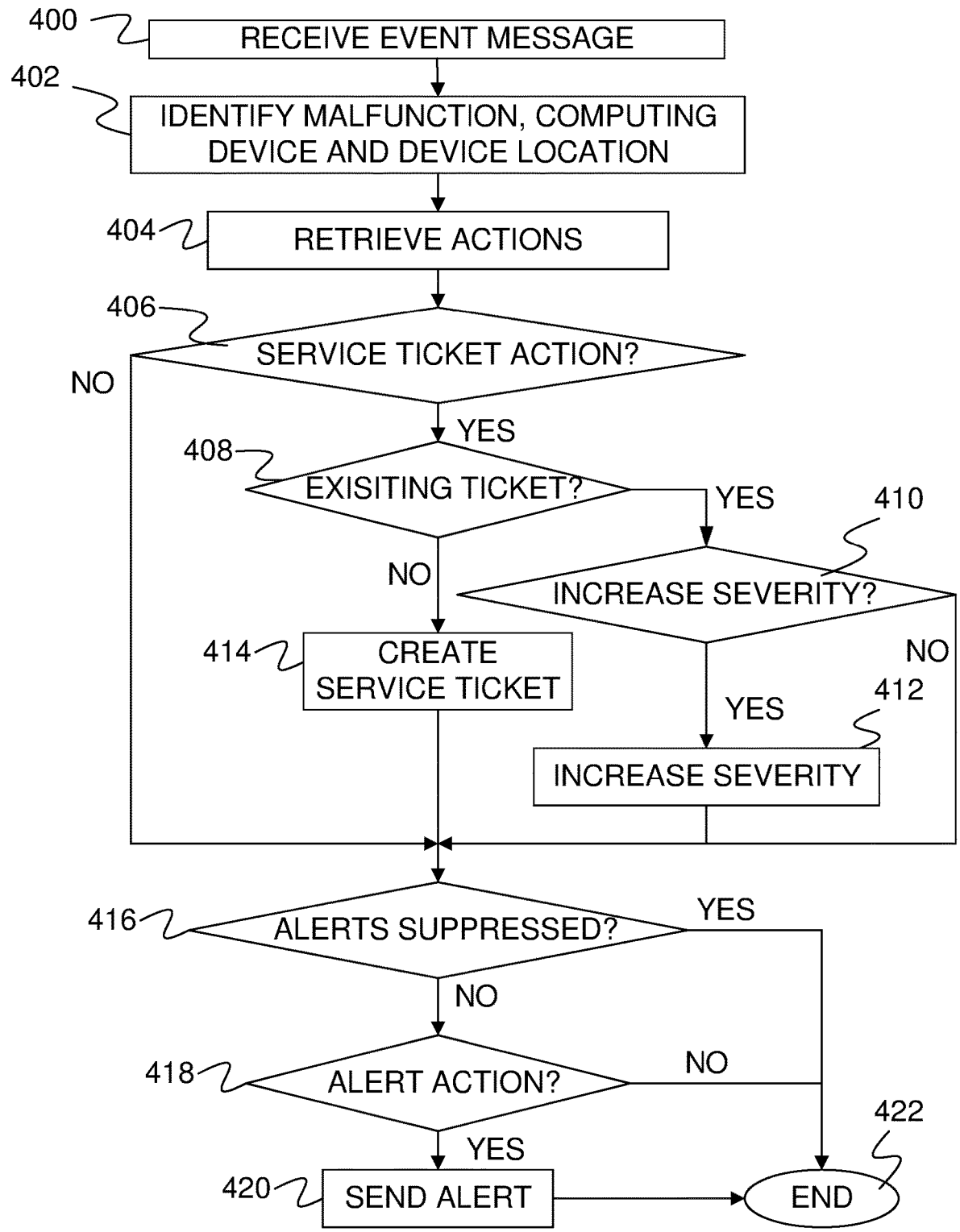
FIG. 4 is a flow diagram of a method performed by a central event message handler.

After receiving an event message, central event message handler determines what actions are to be taken in response to the event message. FIG. 4 provides a flow diagram of a method for making those determinations. In step 400, central event message handler 318 receives an event message. At step 402, central event message handler 318 parses a computing device identifier from the event message and uses the computing device identifier to retrieve a location for the computing device from a device database 350. Central event message handler 318 also determines a malfunction corresponding to the event message. Using the malfunction, the computing device identifier and the location of the computing device, central event message handler 318 retrieves event actions from an event action datastore 352 at step 404.

The event actions describe whether a service ticket is to be generated for the malfunction based on the type of malfunction, the computing device that is experiencing the malfunction and the location of the computing device. In addition, the event actions describe whether and what types of alerts are to be sent out based on the type of malfunction, the computing device and the location of the computing device. In accordance with one embodiment, default service ticket and alert settings are provided for each malfunction that a computing device can experience. These default settings can be overridden based on override setting for all malfunctions that take place in the computing device, or an override setting for all computing devices at a location. In one embodiment, central event message handler 318 monitors a service ticketing system 354 to track when maintenance is being performed on a computing device or when maintenance that would impact all computing devices at a location is being performed. When such events occur, central event message handler 318 suppresses all service ticket creation and all alerts since it is likely that the maintenance is responsible for the event messages that central event message handler 318. This suppression improves the system by reducing the false service tickets and false alerts from being created.

At step 406, central event message handler 318 determines if the event actions for the combination of malfunction, computing device and location indicate that a service ticket should be created for the malfunction. When a service ticket should be created, central event message handler 318 determines if a service ticket has already been created for this malfunction in this computing device at step 408. Such a service ticket may have already been created based on an earlier event message for the same malfunction. If a service ticket already exists, central event message handler 318 uses event actions data store 352 to determine if the severity of the service ticket should be increased at step 410. In accordance with some embodiments, if a malfunction continues for longer than a threshold time after a service ticket was created, the severity of the service ticket is increased to provide a stronger indication that the malfunction needs to be corrected. If the severity needs to be increase, central event message handler 318 sends a request to service ticketing system 354 to increase the severity at step 412.

When there is no existing service ticket at step 408, a new service ticket is created using service ticketing system 354 at step 414. After steps 412 and 414, or of there is no need to increase the severity of an existing service ticket at step 410, or if the malfunction does not require a service ticket at step 406, central event message handler 318 determines if alerts have been suppressed for the computing device or location at step 416. In accordance with one embodiment, a user can use a client device 362 to invoke an API 360 in central event message handler 318 to suppress alerts for a computing device or for all computing devices in a location. The alerts may be suppressed indefinitely or for a designated period of time.

When alerts have not been suppressed at step 416, central event message handler 318 determines if event action datastore 352 indicates that an alert should be sent for the malfunction of the computing device. When datastore 352 indicates that an alert should be sent, central event message handler 318 uses information in event action datastore 352 to select an alerting system 370 designated for the malfunction and computing device and to request that the alerting system issue one or more alerts along one or more channels at step 420.

When alerts have been suppressed for the computing device at step 416, or when no alert is to be sent at step 418 or after an alert is sent at step 420, the process of FIG. 4 ends at step 422.

Figure 5:
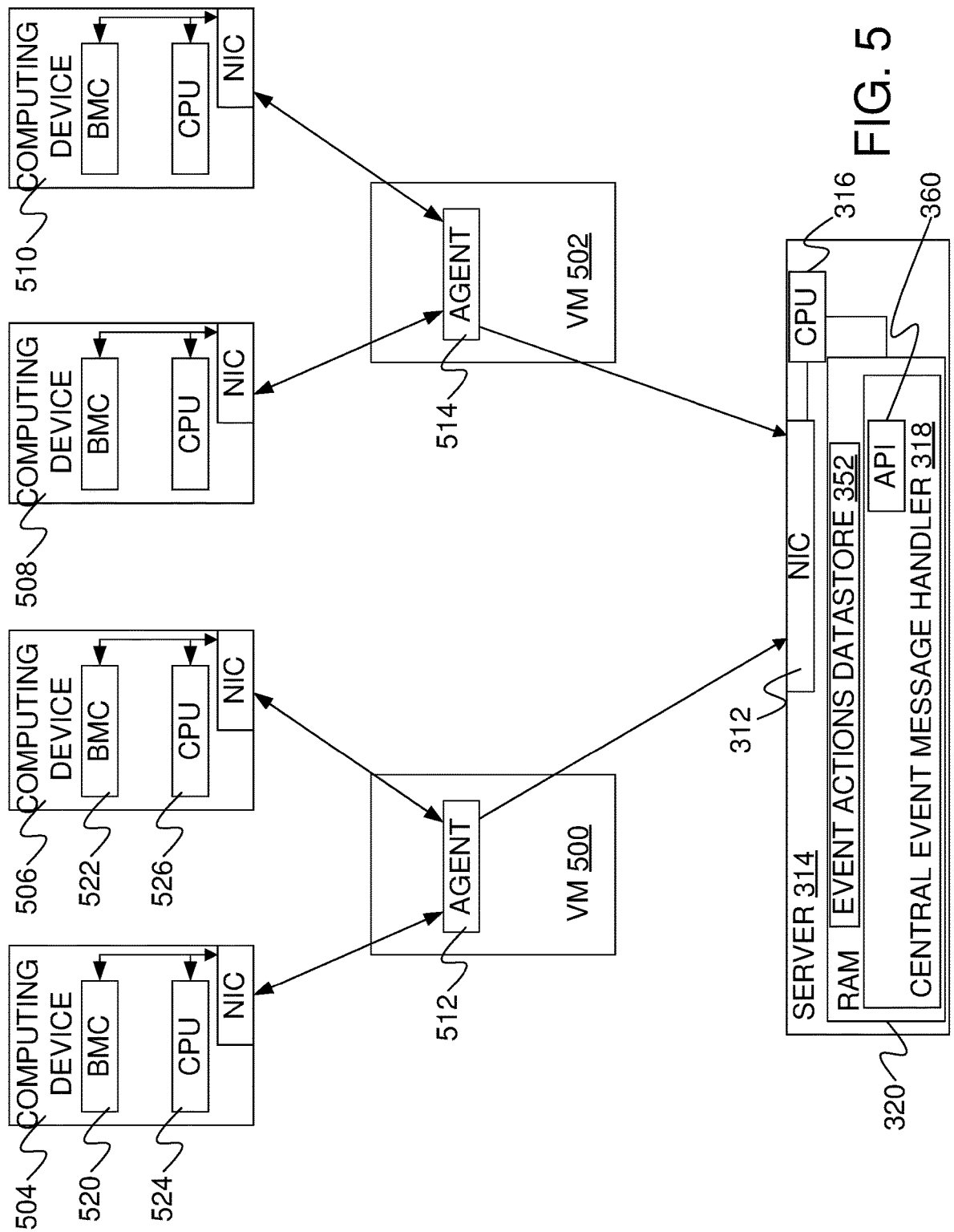
FIG. 5 is a block diagram of a system in accordance with a second embodiment.

In accordance with another embodiment, agent 132 is moved from the computing device, such as computing device 100, to a virtual machine. FIG. 5 provides a block diagram of such an embodiment. In FIG. 5, server 314 containing central event message handler 318 operates in the same manner as discussed above for FIG. 3. In FIG. 5, a layer of virtual machines, such as virtual machines 500 and 502, are provided between central event message handler 318 and a layer of computing devices, such as computing devices 504, 506, 508 and 510. Each virtual machine is executed by a central processing unit (not shown) in a computing device. More than one virtual machine may be implemented on a single computing device. Each virtual machine executes a respective agent, such as agents 512 and 514. Each agent includes a collection of monitors that are responsible for monitoring and verifying a different respective event type logged by baseboard management controllers and operating systems one a plurality of computing devices. For example, a monitor in agent 512 would be responsible for monitoring and verifying an event type logged by baseboard management controllers 520 and 522 of computing devices 504 and 506 while another monitor in agent 512 would be responsible for monitoring and verifying an event type logged by the operating system (not shown) executed by central processing units 524 and 526 of computing devices 504 and 506. Further monitors are provided in agents 512 and 514 to monitor the various event types logged by the baseboard management controller and the operating system.

Each monitor in agents 512, and 514 perform the steps of FIG. 2 for each computing device that the agent is assigned to monitor. Instead of making requests to the baseboard management controller and operating system of the computer that the agent is running on, each monitor requests events from the baseboard management controller and operating system of the computing devices assigned to the agent.

Because multiple agents are used in parallel in the embodiment of FIG. 5, the embodiment is able to reduce the level of data sent to network interface controller 312 and central event message handler 318.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A processor on a computing device executing a monitoring module to perform steps comprising:
sending a request to a baseboard management controller in the computing device to search for an event in an event log maintained by the baseboard management controller;
receiving a response from the baseboard management controller in response to the request, the response indicating a malfunction in the computing device;

using the response and a current state of the monitoring module to determine that a message indicating the malfunction is not to be sent to a central controller located on a network.

2. The processor of claim 1 wherein the current state of the monitoring module comprises a number of times event information regarding a same malfunctioning of the computing device has been received from the baseboard management controller.

3. The processor of claim 1 wherein the current state of the monitoring module comprises a number of times in a period of time that event information regarding a same malfunctioning of the computing device has been received from the baseboard management controller.

4. The processor of claim 2 further comprising updating the current state of the monitoring module based on the response and the current state of the monitoring module.

5. The processor of claim 4 wherein determining not to send the event message comprises determining that a number of times event information regarding the same malfunctioning of the computing device does not exceed a threshold.

6. A system comprising:
   a plurality of computing devices, each computing device having a processor executing an agent that obtains information indicating a malfunction from a baseboard management controller in the computing device and that uses the information indicating a malfunction to determine that an event message indicating a malfunction is not to be transmitted from the computing device so as to avoid transmitting false event messages;
   a server executing a central event message handler configured to receive event messages from the plurality of computing devices and to determine an action to take in response to each event message.

7. The system of claim 6 wherein the agent comprises a separate monitoring module for each of a plurality of possible malfunctions of the computing device.

8. The system of claim 7 wherein a monitoring module determines that the event message indicating a malfunction is not to be transmitted from the computing device based on the information indicating a malfunction and a current state of the monitoring module.

9. The system of claim 8 wherein the current state of the monitoring module comprises a number of times information for a same malfunction of the computing device has been received from the baseboard management controller.

10. The system of claim 9 wherein the computing device further updates the current state of the monitoring module based on the information indicating a malfunction obtained from the baseboard management controller to form an updated state.

11. A computing device comprising:
    a baseboard management controller;
    a processor executing an agent that obtains information indicating a malfunction from the baseboard management controller and that uses the information indicating a malfunction to determine that an event message indicating a malfunction is not to be transmitted across a network so as to avoid transmitting false event messages across the network.

12. The computing device of claim 11 wherein the agent comprises a separate monitoring module for each of a plurality of possible malfunctions of the computing device.

13. The computing device of claim 12 wherein a monitoring module determines whether to transmit the event message based on the information obtained from the baseboard management controller and a current state of the monitoring module.

14. The computing device of claim 13 wherein the current state of the monitoring module comprises a number of times information for a same malfunction of the computing device has been received from the baseboard management controller.

15. The computing device of claim 13 wherein the monitoring module updates the current state of the monitoring module based on the information indicating the malfunction obtained from the baseboard management controller to form an updated state.

16. The computing device of claim 15 wherein updating the current state of the monitoring module comprises increasing a count of the number of times information for a malfunction of the computing device was received.

* * * * *